United States Patent
Allen et al.

(10) Patent No.: US 6,919,946 B2
(45) Date of Patent: Jul. 19, 2005

(54) COMPENSATORS FOR LIQUID CRYSTAL DISPLAYS AND THE USE AND MANUFACTURE OF THE COMPENSATORS

(75) Inventors: Richard C. Allen, Lilydale, MN (US); Thomas Bachels, Grenzach-Wyhlen (DE); Jürg Fünfschilling, Basel (CH); Martin Schadt, Seltisberg (CH); Hubert Seiberle, Weil am Rein (DE)

(73) Assignee: 3M Innovative Properties Company, Saint Paul, MN (US)

( * ) Notice: Subject to any disclaimer, the term of this patent is extended or adjusted under 35 U.S.C. 154(b) by 6 days.

(21) Appl. No.: 10/123,646

(22) Filed: Apr. 16, 2002

(65) Prior Publication Data

US 2003/0193636 A1 Oct. 16, 2003

(51) Int. Cl.$^7$ .............................................. G02F 1/1335
(52) U.S. Cl. ......................... 349/121; 349/119; 349/120
(58) Field of Search ................................. 349/117–121

(56) References Cited

U.S. PATENT DOCUMENTS

| | | | |
|---|---|---|---|
| 5,048,933 A | * | 9/1991 | Asano .......................... 349/61 |
| 5,196,953 A | | 3/1993 | Yeh et al. |
| 5,245,456 A | | 9/1993 | Yoshimi et al. |
| 5,504,603 A | | 4/1996 | Winker et al. |
| 5,526,150 A | | 6/1996 | Mazaki et al. |
| 5,557,434 A | | 9/1996 | Winker et al. |
| 5,567,349 A | | 10/1996 | Kelly et al. |
| 5,612,801 A | | 3/1997 | Winker |
| 5,619,352 A | | 4/1997 | Koch et al. |
| 5,638,197 A | | 6/1997 | Gunning, III et al. |
| 5,650,534 A | | 7/1997 | Kelly et al. |

(Continued)

FOREIGN PATENT DOCUMENTS

| | | |
|---|---|---|
| EP | 331 233 | 9/1989 |
| EP | 646 829 | 4/1995 |
| EP | 656 559 | 6/1995 |
| EP | 839 172 | 5/1998 |
| WO | 96/10769 | 4/1996 |
| WO | 96/10770 | 4/1996 |
| WO | 97/44409 | 11/1997 |
| WO | 99/49360 | 9/1999 |
| WO | 99/64924 | 12/1999 |
| WO | 00/04110 | 1/2000 |
| WO | 00/07975 | 2/2000 |
| WO | 00/48985 | 8/2000 |
| WO | 00/55110 | 9/2000 |
| WO | 00/63154 | 10/2000 |
| WO | 01/20393 | 3/2001 |
| WO | WO 01/20395 A1 | 3/2001 |

OTHER PUBLICATIONS

Chen, et al., "Wide viewing angle photoaligned plastic films for TN–LCDs", *SID 99 Digest*, (1999) pp. 98–101.

Satoh, et al., "Comparison of nematic hybrid and discotic hybrid films as viewing angle compensators for NW–TN–LCDs", *SID 00 Digest*, (2000) pp. 347–349.

Toyooka, et al., "Optical design for wide–viewing–angle TN–LCD with hybrid aligned nematic compensation films" *SID 98 Digest*, (1998) pp. 698–701.

Toyooka, et al., "Viewing angle performance of TN–LCD with hybrid aligned nematic film", *Displays*, (1999) vol. 20, pp. 221–229.

Van De Witte, et al., "Novel compensation foils for active–matrix TN displays", *SID 97 Digest*, (1997) pp. 687–690.

*Primary Examiner*—Robert H. Kim
*Assistant Examiner*—Andrew Schechter
(74) *Attorney, Agent, or Firm*—Anna A. Kobilansky

(57) ABSTRACT

Compensation of a liquid crystal display can be achieved using a compensation structure, having, in the following order: a) a first o-plate; b) a first retarder; c) a liquid crystal cell; d) a second retarder; and e) a second o-plate. The first and second retarders can be c-plates or biaxial retarders.

13 Claims, 3 Drawing Sheets

U.S. PATENT DOCUMENTS

| | | |
|---|---|---|
| 5,731,886 A | 3/1998 | Taber et al. |
| 5,833,880 A | 11/1998 | Siemensmeyer et al. |
| 5,895,106 A * | 4/1999 | VanderPloeg et al. ...... 349/120 |
| 5,943,110 A | 8/1999 | Yoda et al. |
| 5,978,055 A | 11/1999 | Van De Witte et al. |
| 5,982,465 A | 11/1999 | Saxena et al. |
| 5,986,733 A | 11/1999 | Winker et al. |
| 5,986,734 A | 11/1999 | Winker et al. |
| 5,990,997 A * | 11/1999 | Jones et al. ................. 349/120 |
| 5,995,184 A | 11/1999 | Chung et al. |
| 6,113,811 A | 9/2000 | Kausch et al. |
| 6,160,597 A | 12/2000 | Schadt et al. |
| 6,215,539 B1 | 4/2001 | Schadt et al. |
| 6,266,114 B1 | 7/2001 | Skarohlid |
| 6,300,991 B1 | 10/2001 | Schadt et al. |
| 6,320,634 B1 | 11/2001 | Winker et al. |
| 6,369,869 B2 | 4/2002 | Schadt et al. |

* cited by examiner

US 6,919,946 B2

COMPENSATORS FOR LIQUID CRYSTAL DISPLAYS AND THE USE AND MANUFACTURE OF THE COMPENSATORS

BACKGROUND OF THE INVENTION

Twisted nematic (TN) liquid crystal displays have inherently narrow and non-uniform viewing angle characteristics. Such viewing angle characteristics can describe, at least in part, the optical performance of a display. Characteristics such as contrast, color, and gray scale intensity profile can vary substantially in uncompensated displays for different viewing angles. There is a desire to modify these characteristics from those of an uncompensated display to provide a desired set of characteristics as a viewer changes positions horizontally, vertically, or both and for viewers at different horizontal and vertical positions. For example, in some applications there may be a desire to make the viewing characteristics more uniform over a range of horizontal or vertical positions.

The range of viewing angles that are important can depend on the application of the liquid crystal display. For example, in some applications, a broad range of horizontal positions may be desired, but a relatively narrow range of vertical positions may be sufficient. In other applications, viewing from a narrow range of horizontal or vertical angles (or both) may be desirable. Accordingly, the desired optical compensation for non-uniform viewing angle characteristics can depend on the desired range of viewing positions.

One important viewing angle characteristic is the contrast ratio between the bright state and the dark state of the liquid crystal display. The contrast ratio can be affected by a variety of factors including, for example, leakage of light at different viewing angles.

Another viewing angle characteristic is the color shift of the display with changes in viewing angle. Color shift refers to the change in the color coordinates (e.g., the color coordinates based on the CIE 1931 standard) of the light from the display as viewing angle is altered. Color shift can be measured by taking the difference in the chromaticity color coordinates (e.g., $\Delta x$ or $\Delta y$) at an angle normal to the plane containing the screen and at any non-normal viewing angle or set of viewing angles. The definition of acceptable color shift is determined by the application, but can be defined as when the absolute value of $\Delta x$ or $\Delta y$ exceeds some value, for example, exceeds 0.05 or 0.10. For example, it can be determined whether the color shift is acceptable for a desired set of viewing angles. Because the color shift may depend upon the voltage to any pixel or set of pixels, color shift is ideally measured at one or more pixel driving voltages.

Yet another viewing angle characteristic that can be observed is substantial non-uniform behavior of gray scale voltage changes and even the occurrence of gray scale inversion. The non-uniform behavior occurs when the angular dependent transmission of the liquid crystal layer does not monotonically follow the voltage applied to the layer. Gray scale inversion occurs when the ratio of intensities of any two adjacent gray levels approaches a value of one, where the gray levels become indistinguishable or even invert. Typically, gray scale inversion occurs only at some viewing angles.

Compensators have been proposed to address these issues. One concept includes a compensator film made of discotic molecules. One drawback of current discotic compensators is the typical occurrence of comparatively large color shifts. Other concepts include specific combinations of birefringent layers. There is a need for new compensator structures to provide improved or desired viewing angle characteristics.

SUMMARY OF THE INVENTION

Generally, the present invention relates to optical compensators for displays, such as liquid crystal displays, as well as the displays and other devices containing the optical compensators and methods of making and using the optical compensators, displays, and other devices.

One embodiment is a liquid crystal display, having, in the following order: a) a first o-plate having a first azimuthal orientation; b) a first c-plate; c) a liquid crystal cell; d) a second c-plate; and e) a second o-plate having a fourth azimuthal orientation. The liquid crystals at the rear surface of the liquid crystal cell have a second azimuthal orientation and the liquid crystals at the front surface of the liquid crystal cell have a third azimuthal orientation. The first, second, third and fourth azimuthal orientations are disposed in a helical arrangement.

Another embodiment is a liquid crystal display, having, in the following order: a) a first o-plate; b) a first retarder; c) a liquid crystal cell; d) a second retarder; and e) a second o-plate. At least one of the first and second retarders is a biaxial retarder. The other of the first and second retarders can be, for example, a biaxial retarder or a c-plate.

Yet other embodiments include methods for the compensation of liquid crystal displays. These methods include directing light through one of the liquid crystal display compensation structures described above.

The above summary of the present invention is not intended to describe each disclosed embodiment or every implementation of the present invention. The Figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
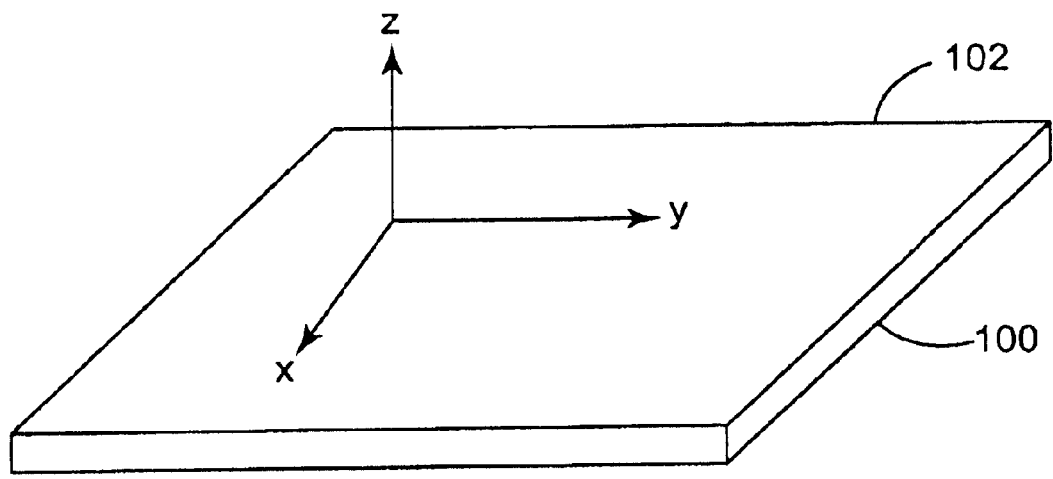
FIG. 1 is a schematic illustration of a coordinate system with an optical element.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENT

The present invention is believed to be applicable to optical compensators for displays, such as liquid crystal displays, as well as the displays and other devices containing the optical compensators and methods of making and using the optical compensators, displays, and other devices. While the present invention is not so limited, an appreciation of various aspects of the invention will be gained through a discussion of the examples provided below.

The optical compensators can be formed using a variety of different optical elements. Among these optical elements are o-plates, c-plates, a-plates, biaxial retarders, twisted retarders, and other retarders. Information regarding o-plates, c-plates, and a-plates can be found, for example, in Yeh et al., *Optics of Liquid Crystal Displays*, John Wiley & Sons, New York (1999), U.S. Pat. Nos. 5,504,603, 5,557, 434, 5,612,801, 5,619,352, 5,638,197, 5,986,733, and 5,986, 734, and PCT Patent Applications Publication Nos. WO 01/20393 and WO 01/20394, all of which are incorporated herein by reference.

Figure 2:
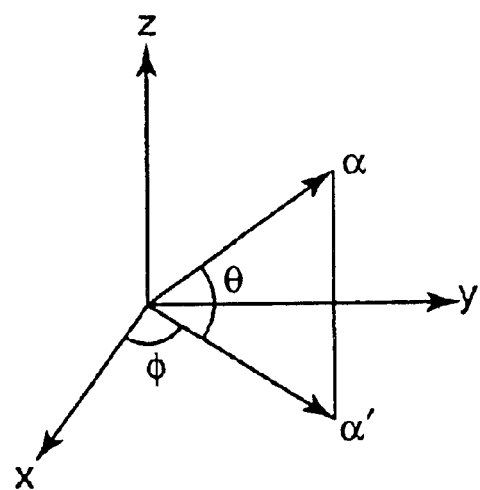
FIG. 2 is a further schematic illustration of the coordinate system.

The optical elements are configured in combinations as described below to form optical compensators. FIG. 1 illustrates an axis system for use in describing the optical elements. Generally, for display devices, the x and y axes correspond to the width and length of the display and the z axis is typically along the thickness direction of the display. This convention will be used throughout, unless otherwise stated. In the axis system of FIG. 1, the x axis and y axis are defined to be parallel to a major surface 102 of the optical element 100 and may correspond to length and width directions of a square or rectangular surface. The z axis is perpendicular to that major surface and is typically along the thickness direction of the optical element. A vector $\vec{a}$ (such as an optical axis) in this coordinate system can be characterized, as illustrated in FIG. 2, by an azimuthal angle $\phi$, corresponding to the angle at which the vector deviates from the x axis in the x-y plane, and a tilt angle $\phi$, corresponding to the angle at which the vector deviates from the x-y plane.

The term "front", as it relates to any of the optical elements described below, shall refer to the side of the optical element that, when in a display device, is nearest to the viewer. The term "rear", as it relates to any of the optical elements described below, shall refer to the side of the optical element that, when in a display device, is opposite to the front of the optical element and typically the furthest from the viewer. For convenience, the convention in the Figures has the front as the right-most side of the optical elements.

A "c-plate" denotes a birefringent optical element, such as, for example, a plate or film, with a principle optical axis (often referred to as the "extraordinary axis") substantially perpendicular to the selected surface of the optical element. The principle optical axis corresponds to the axis along which the birefringent optical element has an index of refraction different from the substantially uniform index of refraction along directions normal to the principle optical axis. As one example of a c-plate, using the axis system illustrated in FIG. 1, $n_x=n_y \neq n_z$, where $n_x$, $n_y$, and $n_z$ are the indices of refraction along the x, y, and z axes, respectively. The optical anisotropy is defined as $\Delta n_{zx}=n_z-n_x$.

A variety of materials and methods can be used to make c-plates. For example, positively birefringent c-plates (where $\Delta n_{zx}$ is greater than zero) can be formed using vertically-aligned films of rodlike molecules, such as, for example, positive optical anisotropy liquid crystals. Uniaxially compressed materials can also be used to make c-plates. Examples of suitable negatively birefringent c-plate materials ($\Delta n_{zx}$ less than zero) include cellulose triacetate (available from, for example, Fuji Photo Film Co. (Tokyo, Japan), Konica Corp. (Tokyo, Japan), and Eastman Kodak Co. (Rochester, N.Y.)), polycarbonate (available from General Electric Plastics), acrylic polymers, and polyesters including polyethylene terephthalate, polyethylene naphthalate and the like. Negative c-plates can also be realized by using twisted a-plates, for example, rodlike molecules with a very high helical twisting power as described by H. Seiberle et al., Eurodisplay'99 Digest, 121–125 (1999). Furthermore, untilted discotic molecules may be used to generate a negative c-plate.

An "o-plate" denotes a birefringent optical element, such as, for example, a plate or film, having its principle optical axis tilted with respect to the surface of the optical element.

An o-plate can be made by a variety of methods and using a variety of materials. For example, an o-plate can be formed using a liquid crystal material disposed on an alignment layer, where the alignment layer induces a pretilt in the liquid crystal material. As one example, a liquid crystal polymer (LCP) can be used, such as a liquid crystal polymer having vitrified, polymerized, or cross-linked liquid crystal moieties. Examples of suitable materials include polymerizable liquid crystal materials, which are well known to those skilled in the art. Examples of such materials and methods of making and using the materials can be found in, for example, U.S. Pat. Nos. 5,567,349, 5,650,534, and 5,978,055, European Patent Application Publication No. 331233, and PCT Patent Applications Publication Nos. 95/24454, 00/04110, 00/07975, 00/48985, 00/55110, and 00/63154, all of which are incorporated herein by reference. Examples of other suitable materials include discotic materials as disclosed in, for example, European Patent Application Publication Nos. 646829 and 656559, both of which are incorporated herein by reference. In one embodiment, the liquid crystalline polymer is aligned during manufacture by a photoorientation technique, which is able to induce a predetermined tilt angle in the subsequently deposited polymerizable liquid crystal. Among the different known methods, particularly well suited are methods that use linear photopolymerization (LPP) materials, also sometimes referred to as photooriented polymer networks (PPN). Examples and manufacture of such materials and structures are disclosed in, for example, U.S. Pat. Nos. 5,389,698, 5,838,407, and 5,602,661, European Patent Applications Publication Nos. 689,084 and 756,193, and PCT Patent Applications Publication Nos. 99/49360, and 99/64924, all of which are incorporated herein by reference.

An "a-plate" denotes a birefringent optical element, such as, for example, a plate or film, having its principle optic axis within the x-y plane of the optical element. Positively birefringent a-plates can be fabricated using, for example, uniaxially stretched films of polymers such as, for example, polyvinyl alcohol, or uniaxially aligned films of nematic positive optical anisotropy LCP materials. Negatively birefringent a-plates can be formed using uniaxially aligned films of negative optical anisotropy nematic LCP materials, including for example discotic compounds.

A "biaxial retarder" denotes a birefringent optical element, such as, for example, a plate or film, having different indices of refraction along all three axes (i.e., $n_x \neq n_y \neq n_z$). Biaxial retarders can be fabricated, for example, by biaxially orienting plastic films. Examples of biaxial retarders are discussed in U.S. Pat. No. 5,245,456, incorporated herein by reference. Examples of suitable films include films available from Sumitomo Chemical Co. (Osaka, Japan) and Nitto Denko Co. (Osaka, Japan). In plane retardation and out of plane retardation are parameters used to describe a biaxial retarder. As the in-plane retardation approaches zero, then the biaxial retarder element behaves more like a c-plate. Generally, a biaxial retarder, as defined herein, has an in-plane retardation of at least 3 nm for 550 nm light. Retarders with lower in-plane retardation are considered c-plates.

The range or solid cone of desired viewing angles can be manipulated depending upon the exact nature of the application. For example, in some embodiments, it is desirable to have a large solid angle of acceptable viewing. In other embodiments, it is desirable to strictly control the range of acceptable viewing (for example, for privacy purposes) to a narrower range of angles than is normally associated with an uncompensated display.

In one embodiment, brightness and contrast are generally enhanced and color shifts and gray scale inversion are generally reduced for a range of horizontal viewing angles relative to an uncompensated display. In another embodiment, brightness and contrast are generally enhanced and color shifts and gray scale inversion are generally reduced for a range of vertical viewing angles relative to an uncompensated display. In yet another embodiment, brightness and contrast are generally enhanced and color shifts and gray scale inversion are generally reduced for a range of both horizontal and vertical viewing angles relative to an uncompensated display. In another embodiment, brightness and contrast are generally enhanced and color shifts and gray scale inversion are generally reduced for a narrow range of horizontal viewing angles and brightness and contrast are generally enhanced and color shifts and gray scale inversion are generally reduced for a desired (for example, narrow or broad) range of vertical viewing.

Figure 3:
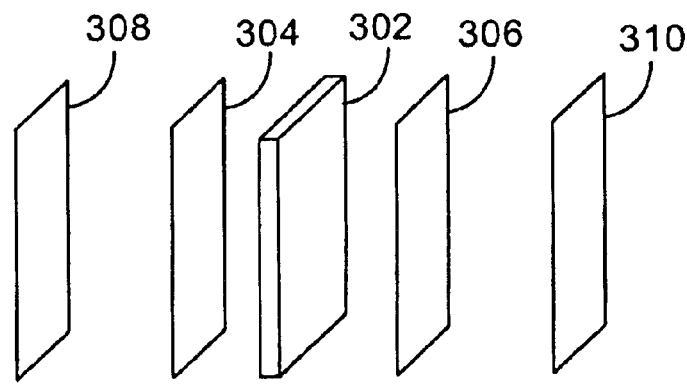
FIG. 3 is a schematic perspective view of a liquid crystal display compensation structure.

FIG. 3 illustrates one example of an arrangement 300 for compensation of a liquid crystal cell 302 using a symmetrical compensator structure with o-plates 304, 306. The liquid crystal cell 302 can be, for example, a twisted nematic (TN) liquid crystal cell which uses associated polarizers, for example, a rear polarizer 308 and front polarizer (analyzer) 310. Other liquid crystal cells can also be used. The liquid crystal cell can be operated in any mode, but the selection of a compensator structure may depend on the operational mode of the liquid crystal cell. For example, a TN liquid crystal cell can be operated in the e-mode, where the pass polarization direction of the front and rear polarizers is aligned parallel with the liquid crystal director of the corresponding front or rear surface of the liquid crystal cell, or the o-mode, where the pass polarization direction of the front and rear polarizers is aligned orthogonal to the liquid crystal director at the corresponding front or rear surface of the liquid crystal cell.

A variety of polarizers may be used in combination with the compensator structures. The polarizers can be absorbing or reflective or a combination thereof. One example of a suitable polarizer (particularly suitable for rear polarizer 308) is a combination dichroic and reflective polarizer as described, for example, in U.S. Pat. No. 6,113,811, incorporated herein by reference. This polarizer can include more than one layer. One or more components of the compensator structure can be incorporated into the polarizer, if desired. In one embodiment, a reflective polarizer, for example a circular polarizer which substantially transmits one hand of circularly polarized light and substantially reflects the other hand, can incorporate a quarter wave plate to convert the circularly polarized light to linearly polarized light.

Figure 4:
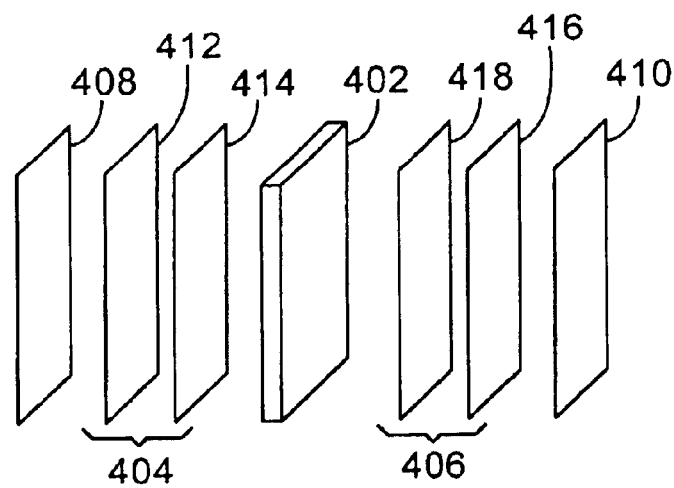
FIG. 4 is a schematic perspective view of a first embodiment of a liquid crystal display compensation structure according to the invention.

FIG. 4 illustrates one example of a compensation arrangement 400 with compensator structures 404, 406 and a liquid crystal cell 402 with associated polarizers 408, 410. The compensator structures 404, 406 each include an o-plate 412, 416 and a c-plate 414, 418 with the c-plate positioned between the liquid crystal cell 402 and the corresponding o-plate. In other words, the c-plates 414, 418 are situated between the respective o-plates 412, 416 and the liquid crystal cell 402 and not between the o-plate and the front or rear polarizer, respectively. Preferably, in this configuration and the other configurations described below, the o-plate/c-plate arrangements behind and in front of the liquid crystal cell have the same properties, so that only one type of o-plate and one type of c-plate is used. In one embodiment, the o-plates 412, 416 are positive o-plates and the c-plates 414, 418 are negative c-plates.

The retardation value (∆nd, where ∆n is the difference in indices of refraction for the extraordinary and ordinary light beams and d is the physical thickness of the optical element) of the o-plates and c-plates can be selected to provide particular optical properties, ease of manufacture, or other properties. As an example, the o-plates have retardation value in the range of ±30 nm to ±1000 nm, more preferably between ±50 nm and ±750 nm, and most preferably between ±60 nm and 1500 nm. The c-plates have a retardation value in the range of ±10 nm to ±1000 nm, more preferably between ±20 nm and +750 nm, and most preferably between ±20 nm and ±500 nm. Higher or lower retardation values can be used, as desired.

In some embodiments, the c-plate can act as a substrate upon which the o-plate can be formed. Optionally, the c-plate can act as an alignment layer for the o-plate. In other embodiments, a separate substrate can be used for the o-plate with the c-plate being an independent optical element or formed on an opposing side or the same side of the substrate.

Figure 5:
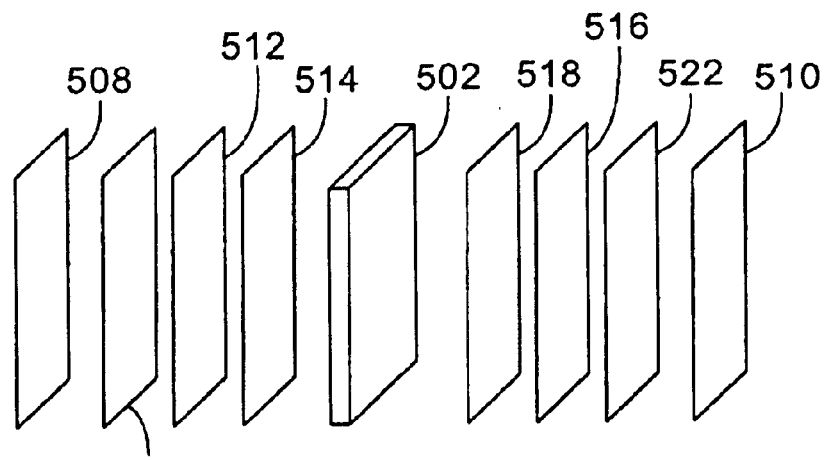
FIG. 5 is a schematic perspective view of a second embodiment of a liquid crystal display compensation structure according to the invention.

Optionally, other retarder elements, such as additional o-plates, c-plates, a-plates, or biaxial retarders, can be added to the basic configuration illustrated in FIG. 4. For example, additional c-plates 520, 522 can be added between the respective o-plates 512, 516 and the front or rear polarizer 508, 510 respectively. This is in addition to the c-plates 514, 518 between the o-plates 512, 516 and liquid crystal cell 502. Optionally, one or more a-plates can be positioned between any of the elements in either of the configurations illustrated in FIGS. 4 and 5. The c-plates 514, 518 can be positive or negative c-plates. In one embodiment, the c-plates 514, 518, 520, 522 are negative c-plates. In another embodiment, the c-plates 520, 522 are positive c-plates and the c-plates 514, 518 are negative c-plates.

Figure 6:
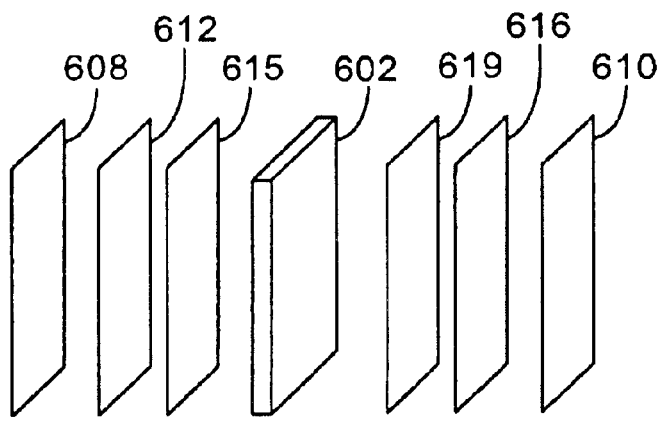
FIG. 6 is a schematic perspective view of a third embodiment of a liquid crystal display compensation structure according to the invention.

In other embodiments, one or both of the c-plates in FIG. 4 can be replaced by biaxial retarders. FIG. 6 illustrates one example of a configuration having biaxial retarders with a liquid crystal cell 602, front and rear polarizers 608, 610, o-plates 612, 616, and biaxial retarders 615, 619 between the o-plates and the liquid crystal cell. The configuration illustrated in FIG. 5 can also be modified with at least one biaxial retarder replacing one or more of the c-plates, preferably replacing at least one or both of the c-plates between the o-plates and the liquid crystal cell. In one embodiment, the biaxial retarders have a negative out-of-plane birefringence and the o-plates are positive o-plates. Configurations having biaxial retarders with positive out-of-plane birefringence can also be formed.

The in plane retardation and out of plane retardation values of the biaxial retarders can be selected to provide particular optical properties, ease of manufacture, or other properties. The biaxial retarders are characterized by two retardance values: $(\Delta nd)_{op}=(n_z-(n_x+n_y)/2)\cdot d$ and $(\Delta nd)_{ip}=(n_y-n_x)\cdot d$, where $(\Delta nd)_{op}$ describes the out-of-plane retardance and $(\Delta nd)_{ip}$ specifies the retardance occurring within the film plane. As examples, the biaxial retarders can have an in-plane retardation value in the range of ±3 nm to +500 nm and an out-of-plane retardation value in the range of ±10 nm to ±1000 nm. Higher or lower retardation values can also be used as desired.

The relative orientations of the optical axes of the various optical elements can affect the compensation properties of the liquid crystal display. Suitable orientations for the various optical elements can be selected to obtain desired characteristics. In some embodiments, the o-plates and liquid crystal cells are selected so that the azimuthal orientation of a) the rear o-plate, b) the director of the liquid crystal material at the rear surface of the liquid crystal cell, c) the director of the liquid crystal material at the front surface of the liquid crystal cell, and d) the front o-plate define a helical arrangement with a uniform twist sense. In other words, these four azimuthal orientations increase or decrease monotonically in the order listed. For example, this stepwise change in azimuthal angle can be approximately 90±5 degrees, although changes in the range of, for example, about 75 degrees to about 105 degrees are also suitable.

Figure 7:
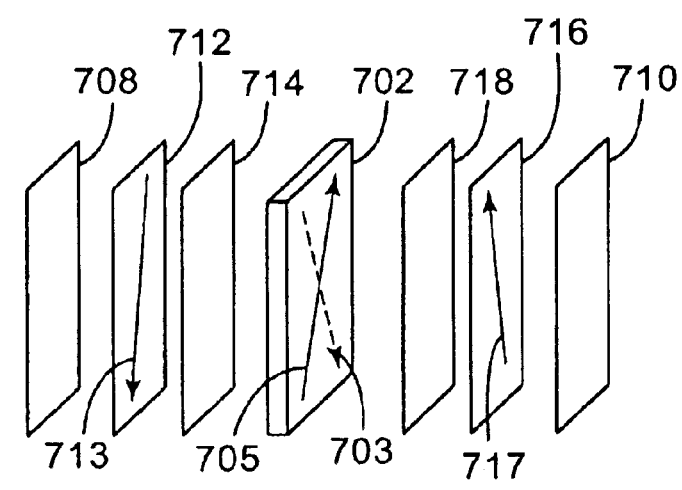
FIG. 7 is a schematic perspective view of a fourth embodiment of a liquid crystal display compensation structure according to the invention.

FIG. 7 illustrates one example of such an arrangement with the azimuthal orientations 713, 717 of the o-plates and director 703 at the rear surface and director 705 at the front surface of the liquid crystal cell 702 being represented by arrows. These arrows specify both the azimuthal orientation of the optical axis and the direction of its tilt, and as such define a vector, $\vec{a}$ (see FIG. 2). The arrows shown in FIG. 7 correspond to the vector $\vec{a}'$ (see FIG. 2) which results from a projection of the vector $\vec{a}$ (the vector reproducing the optical axis) onto the x-y plane. The front and rear polarizers 710, 708 and c-plates 714, 718 are also present. In this illustrated example the azimuthal orientations of the opiates and liquid crystal cell are, in an arbitrary coordinate system, approximately 135° for the first o-plate, approximately 225° for the rear surface director, approximately 315° for the front surface director, and approximately 45° for the second o-plate. It can be seen that these four azimuths rotate in approximately 90° steps in the same direction of rotation or, in other words, describe an approximate 90° increment helical arrangement. The direction of rotation or twist sense can be, for example, clockwise or counterclockwise as observed by a viewer in front of the display.

Preferably, the azimuthal orientations increase or decrease in this helical arrangement by substantially the same increment. The degree to which the increments differ can depend upon the application, the angularly dependent set of desired viewing angles, and the desired brightness, contrast, color shift and gray scale inversion characteristics. In one embodiment where good horizontal viewing is desired with good brightness and contrast and reduced color shift and gray scale inversion, the increments preferably differ by no more than about five degrees and, preferably, by no more than about two degrees.

Preferably, the azimuthal orientations between i) the first o-plate and the director at the rear surface, ii) the director at the rear surface and the director at the front surface, and iii) the director at the front surface and the second o-plate differ independently by 75 to 105 degrees, more preferably, by 85 to 95 degrees, and, in one embodiment, by about 90 degrees.

In addition to the effects of the azimuthal orientation of the o-plates, the tilt angle θ of the o-plates can alter the compensator characteristics. Typically, the tilt angle of the o-plates is in the range of about 2 to about 85 degrees and preferably in the range of about 5 to about 70 degrees. The tilt angles for the two o-plates can be different or substantially the same value.

In some embodiments, the tilt of the optical axis (θ of FIG. 2) of the o-plate retarders is not uniform but varies across the thickness of the o-plate, preferably according to a predefined tilt profile. The tilt angle for the o-plate can increase or decrease from the front of the o-plate to the back of the o-plate where the front of the o-plate is defined as the surface positioned nearest the viewer of the liquid crystal display. The range of the variation in tilt angle typically depends on the desired viewing angle characteristics. For example, in some embodiments, the tilt angle varies (either front-to-back or back-to-front) from a value in the range of 0 to 10 degrees to a value in the range of 25 to 55 degrees. In other embodiments, the tilt angle varies from a value in the range of 0 to 10 degrees to a value in the range of 75 to 90 degrees. It will be understood that other ranges can be selected and that these examples are not meant to be limiting.

Figure 8:
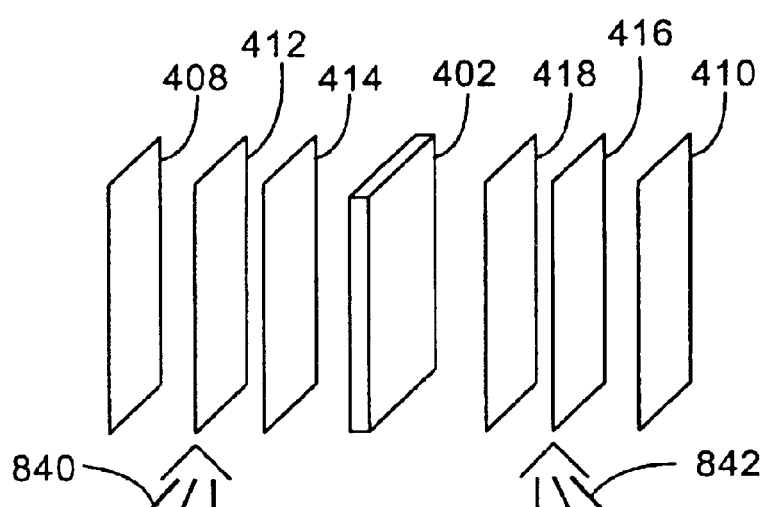
FIG. 8 is a schematic perspective view of a fifth embodiment of a liquid crystal display compensation structure according to the invention.

FIG. 8 illustrates one embodiment of the configuration of FIG. 4 (where like reference numbers refer to similar elements) with inserts 840 and 842 that illustrate the variation in tilt angle across the o-plates 412, 416. In this illustrated example, the tilt angle increases from front to back of the rear o-plate and from back to front of the front o-plate (where the front is the rightmost surface of the optical element). In some embodiments, both o-plates can increase or decrease in tilt angle, preferably, with substantially the same tilt angle profile. In other embodiments, the tilt angle profile of the two o-plates is independent with, for example, one o-plate having an increasing or decreasing tilt angle profile and the other o-plate having a decreasing or increasing, respectively, tilt angle profile or, alternatively, a homogeneous or uniform tilt angle across the o-plate.

If desired, compensator configurations can be formed that lead to good viewing angle dependence of the contrast ratio, reduce the color shift for some or all viewing angles, or both as compared to an uncompensated twisted nematic liquid crystal display or to twisted nematic liquid crystal displays containing commercial compensators.

Generally, it should be noted that for best performance the optical retardations of the c-plates and o-plates, the azimuthal orientations of the o-plates, and the mean tilt angle within the o-plates may need to be adapted to the properties of the TN cell and the desired specifications regarding contrast performance. The parameters, such as retardation value, azimuthal angle, and tilt angle, of the o-plates, c-plates, biaxial retarders, and other optical elements in the compensator can be adjusted, if desired, to achieve or alter the characteristics of the compensator.

EXAMPLES

The following examples illustrate liquid crystal cell and compensator configurations indicated in the Tables.

Table 1 specifies the properties of a twisted nematic LC cell used to generate Examples 1–58. It should be noted that the Examples described herein are not limited to this particular display configuration.

TABLE 1

LC cell characteristics

| | |
|---|---|
| Cell gap: | 5 μm |
| Δn at 550 nm | 0.082 |
| Optical Retardation: | 410 nm |
| Azimuthal Angles of the LC directors at the rear and front surfaces of the LCD ($\phi_r$, $\phi_f$) | 225°, 315° |
| Tilt Angle: | 3° |
| Dielectric Constants: | $\epsilon_e = 10.5$ $\epsilon_o = 3.6$ |
| Elastic Constants: | $k_{11} = 15$ pN; $k_{22} = 8$ pN; $k_{33} = 21$ pN |

For Examples 1–24, each of Tables 2–7 provides the azimuthal orientation for the directors at the rear and front of the TN liquid crystal cell, designated $\phi_r$ and $\phi_f$. In addition, the optical retardation (the product of the difference between the ordinary and extraordinary refraction indices and the thickness, d, of the particular plate) is provided for both the o-plates and c-plates. All retardation values are specified for light with a wavelength of 550 nm. The Tables also indicate if the tilt angle profile for the o-plates was uniform (indicated by "no"), increasing from front to back, where the front is the surface nearest the viewer of the liquid crystal display (indicated by "+") or decreasing from front to back (indicated by "−"). Additionally, the tilt angles at the front ($\theta_f$) and rear ($\theta_r$) of the o-plates which determine the tilt angle profile are specified. For the purposes of these Examples, the tilt profiles were the same for the two o-plates, unless otherwise noted.

This configurational information was used to calculate the contrast ratio and color shifts at various angles for the particular configuration using the simulation software package DIMOS 1.5c (available from autronic-Melchers, (Karlsruhe, Germany)), which utilizes Berreman formalism. The contrast and color shift were then qualitatively rated on a scale of 1 to 5, with 5 being the best.

Examples 29–58 include tables that describe the retardation values of the corresponding o-plates, c-plates, TN liquid crystal cells, and biaxial retarders; the azimuthal orientation, $\phi$, of the opiates (the TN cells have the same azimuthal orientations as in Examples 1–28), and the front tilt angles, $\theta_f$, and rear tilt angles, $\theta_r$, for the o-plates. Calculations were made using the DIMOS software package.

The Examples are also identified according to the mode of the display: e-mode displays, where the pass axis of the front and rear polarizers is parallel to the director at the nearest surface of the liquid crystal cell (as illustrated in FIG. 7), and o-mode displays, where the pass axis of the front and rear polarizers is crossed at about 90° with respect to the director of the nearest surface of the liquid crystal cell.

Examples 1–3
E-Mode Configurations with Helical Arrangement of Azimuthal Orientations Table 2 describes three different compensator configurations with a helical arrangement of the azimuthal orientations of the o-plates and liquid crystal cell with 90° increments.

TABLE 2

| Ex. | o-plate tilt profile $\theta_r/\theta_f$ $\phi$ | neg. c-pl. | TN $\phi_r$ $\phi_f$ | neg. c-pl. | o-plate tilt profile, $\theta_r/\theta_f$ $\phi$ | o-plate Δnd | c-plate Δnd | Contrast | Color Shift |
|---|---|---|---|---|---|---|---|---|---|
| 1 | no 14°/14° 135° | X | 225° 315° | X | no 14°/14° 45° | 190 nm | −180 nm | 5 | 5 |
| 2 | − 0°/20° 135° | X | 225° 315° | X | + 20°/0° 45° | 330 nm | −170 nm | 5 | 5 |
| 3 | + 36°/0° 135° | X | 225° 315° | X | − 0°/36° 45° | 140 nm | −185 nm | 5 | 5 |

As indicated in Table 2, all three examples have very good contrast and color shift properties, irrespective of the tilt angle profile of the o-plates.

Examples 4–6
O-Mode Configurations with Helical Arrangement of Azimuthal Orientations Table 3 describes three different compensator configurations with a helical arrangement of the azimuthal orientations of the o-plates and liquid crystal cell with 90° increments.

TABLE 3

| Ex. | o-plate tilt profile $\theta_r/\theta_f$ $\phi$ | neg. c-pl. | TN $\phi_r$ $\phi_f$ | neg. c-pl. | o-plate tilt profile $\theta_r/\theta_f$ $\phi$ | o-plate $\Delta nd$ | c-plate $\Delta nd$ | Contrast | Color Shift |
|---|---|---|---|---|---|---|---|---|---|
| 4 | no 16°/16° 135° | X | 225° 315° | X | no 16°/16° 45° | 165 nm | −80 nm | 4 | 5 |
| 5 | − 0°/22° 135° | X | 225° 315° | X | + 22°/0° 45° | 220 nm | −100 nm | 3 | 5 |
| 6 | + 34°/0° 135° | X | 225° 315° | X | − 0°/34° 45° | 160 nm | −90 nm | 5 | 5 |

As indicated in Table 3, all examples give acceptable contrast and very good color shift. The best contrast is found for configurations where the tilt angle of the o-plates increases from front to back for the rear o-plate and from back to front for the front o-plate.

Examples 7–9
E-Mode Configurations with Non-Helical Arrangement of Azimuthal Orientations Table 4 describes three different compensator configurations with a non-helical arrangement of the azimuthal orientations of the o-plates and liquid crystal cell.

TABLE 4

| Ex. | o-plate tilt profile $\theta_r/\theta_f$ $\phi$ | neg. c-pl. | TN $\phi_r$ $\phi_f$ | neg. c-pl. | o-plate tilt profile $\theta_r/\theta_f$ $\phi$ | o-plate $\Delta nd$ | c-plate $\Delta nd$ | Contrast | Color Shift |
|---|---|---|---|---|---|---|---|---|---|
| 7 | no 50°/50° 45° | X | 225° 315° | X | No 50°/50° 135° | 75 nm | −170 nm | 3 | 1 |
| 8 | − 0°/70° 45° | X | 225° 315° | X | + 70°/0° 135° | 100 nm | −130 nm | 3 | 1 |
| 9 | + 70°/0° 45° | X | 225° 315° | X | − 0°/70° 135° | 55 nm | −150 nm | 3 | 1 |

Contrast and color shift are not as good as Examples 1–3.

Examples 10–12
O-Mode Configurations with Non-Helical Arrangement of Azimuthal Orientations Table 5 describes three different compensator configurations with a non-helical arrangement of the azimuthal orientations of the o-plates and liquid crystal cell.

TABLE 5

| Ex. | o-plate tilt profile $\theta_r/\theta_f$ $\phi$ | neg. c-pl. | TN $\phi_r$ $\phi_f$ | neg. c-pl. | o-plate tilt profile $\theta_r/\theta_f$ $\phi$ | o-plate $\Delta$nd | c-plate $\Delta$nd | Contrast | Color Shift |
|---|---|---|---|---|---|---|---|---|---|
| 10 | no 75°/75° 45° | X | 225° 315° | X | no 75°/75° 135° | 200 nm | −100 nm | 2 | 1 |
| 11 | − 0°/80° 45° | X | 225° 315° | X | + 80°/0° 135° | 160 nm | −25 nm | 2 | 1 |
| 12 | + 72°/0° 45° | X | 225° 315° | X | − 0°/72° 135° | 80 nm | −35 nm | 2 | 1 |

Contrast and color shift are not as good as Examples 4–6.

Examples 13–18
E-Mode Configurations with the O-Plates Positioned Between the Liquid Crystal Cell and Negative C-Plates Table 6 describes three different compensator configurations with o-plates positioned between the c-plates and liquid crystal cell.

TABLE 6

| Ex. | neg. c-pl. | o-plate tilt profile $\theta_r/\theta_f$ $\phi$ | TN $\phi_r$ $\phi_f$ | o-plate tilt profile $\theta_r/\theta_f$ $\phi$ | neg. c-pl. | o-plate $\Delta$nd | c-plate $\Delta$nd | contrast | color shift |
|---|---|---|---|---|---|---|---|---|---|
| 13 | X | no 27°/27° 135° | 225° 315° | no 27°/27° 45° | X | 85 nm | −180 nm | 3 | 3 |
| 14 | X | no 80°/80° 45° | 225° 315° | no 80°/80° 135° | X | 220 nm | −330 nm | 4 | 1 |
| 15 | X | − 0°/70° 135° | 225° 315° | + 70°/0° 45° | X | 60 nm | −240 nm | 3 | 3 |
| 16 | X | − 0°/70° 45° | 225° 315° | + 70°/0° 135° | X | 150 nm | −20 nm | 2 | 1 |
| 17 | X | + 70°/0° 135° | 225° 315° | − 0°/70° 45° | X | 150 nm | −160 nm | 3 | 3 |
| 18 | X | + 80°/0° 45° | 225° 315° | − 0°/80° 135° | X | 20 nm | −175 nm | 3 | 1 |

Typically, color shift and contrast are not as good as Examples 1–3.

Examples 19–24
O-Mode Configurations with the O-Plates Positioned Between the Liquid Crystal Cell and Negative C-Plates Table 7 describes three different compensator configurations with o-plates positioned between the c-plates and liquid crystal cell.

TABLE 7

| Ex. | neg. c-pl. | o-plate tilt profile $\theta_r/\theta_f$ $\phi$ | TN $\phi_f$ $\phi_r$ | o-plate tilt profile $\theta_r/\theta_f$ $\phi$ | neg. c-pl. | o-plate $\Delta$nd | c-plate $\Delta$nd | contrast | color shift |
|---|---|---|---|---|---|---|---|---|---|
| 19 | X | no 20°/20° 135° | 225° 315° | no 20°/20° 45° | X | 165 nm | −50 nm | 3 | 4 |
| 20 | X | No 67°/67° 45° | 225° 315° | No 67°/67° 135° | X | 155 nm | −150 nm | 2 | 1 |
| 21 | X | − 0°/64° 135° | 225° 315° | + 64°/0° 45° | X | 140 nm | −130 nm | 3 | 4 |

TABLE 7-continued

| Ex. | neg. c-pl. | o-plate tilt profile $\theta_r/\theta_f$ $\phi$ | TN $\phi_f$ $\phi_r$ | o-plate tilt profile $\theta_r/\theta_f$ $\phi$ | neg. c-pl. | o-plate $\Delta nd$ | c-plate $\Delta nd$ | contrast | color shift |
|---|---|---|---|---|---|---|---|---|---|
| 22 | X | −<br>0°/72°<br>45° | 225°<br>315° | +<br>72°/0°<br>135° | X | 125 nm | −75 nm | 2 | 1 |
| 23 | X | +<br>56°/0°<br>135° | 225°<br>315° | −<br>0°/56°<br>45° | X | 160 nm | −75 nm | 3 | 5 |
| 24 | X | +<br>76°/0°<br>45° | 225°<br>315° | −<br>0°/76°<br>135° | X | 85 nm | −85 nm | 2 | 1 |

Typically, color shift and contrast are not as good as Examples 4 and 6, but Example 23 is comparable to Example 5 in both color shift and contrast and Examples 19 and 21 are comparable to Example 5 in contrast.

Examples 25–28
Other O-Mode Configurations
Tables 8 and 9 illustrate o-mode compensator configurations with variations in the o-plate and c-plate parameters.

TABLE 8

| | o-plate | | | | c-plate | TN | c-plate | o-plate | | | |
|---|---|---|---|---|---|---|---|---|---|---|---|
| Ex. | $\Delta nd$ | $\phi$ | $\theta_r$ | $\theta_f$ | $\Delta nd$ | $\Delta nd$ | $\Delta nd$ | $\Delta nd$ | $\phi$ | $\theta_r$ | $\theta_f$ |
| 25 | 159 | 135 | 30 | 3 | −95 | 410 | −95 | 159 | 45 | 3 | 30 |
| 26 | 171 | 135 | 27 | 3 | −106 | 410 | −105 | 175 | 45 | 3 | 28 |

TABLE 9

| | c-plate | o-plate | | | | c-plate | TN | c-plate | o-plate | | | | c-plate |
|---|---|---|---|---|---|---|---|---|---|---|---|---|---|
| Ex. | $\Delta nd$ | $\Delta nd$ | $\phi$ | $\theta_r$ | $\theta_f$ | $\Delta nd$ | $\Delta nd$ | $\Delta nd$ | $\Delta nd$ | $\phi$ | $\theta_r$ | $\theta_f$ | $\Delta nd$ |
| 27 | −40 | 140 | 135 | 39 | 3 | −80 | 410 | −80 | 140 | 45 | 3 | 39 | −40 |
| 28 | −44 | 152 | 135 | 36 | 3 | −73 | 410 | −79 | 152 | 45 | 3 | 35 | −40 |

The compensators of Examples 25 and 27 have better contrast than the compensators of Examples 26 and 28, respectively. Color shift is substantially similar for all four Examples. The compensator of Example 25 has somewhat better contrast than the compensator of Example 27.

Examples 29–32

Other E-Mode Configurations

Tables 10 and 11 illustrate e-mode compensator configurations with variations in the o-plate and c-plate parameters.

TABLE 10

| | o-plate | | | | c-plate | TN | c-plate | o-plate | | | |
|---|---|---|---|---|---|---|---|---|---|---|---|
| Ex. | $\Delta nd$ | $\phi$ | $\theta_r$ | $\theta_f$ | $\Delta nd$ | $\Delta nd$ | $\Delta nd$ | $\Delta nd$ | $\phi$ | $\theta_r$ | $\theta_f$ |
| 29 | 143 | 135 | 40 | 3 | −185 | 410 | −185 | 143 | 45 | 3 | 40 |
| 30 | 131 | 135 | 40 | 3 | −166 | 410 | −167 | 130 | 45 | 3 | 43 |

TABLE 11

| | c-plate | o-plate | | | | c-plate | TN | c-plate | o-plate | | | | c-plate |
|---|---|---|---|---|---|---|---|---|---|---|---|---|---|
| Ex. | $\Delta nd$ | $\Delta nd$ | $\phi$ | $\theta_r$ | $\theta_f$ | $\Delta nd$ | $\Delta nd$ | $\Delta nd$ | $\Delta nd$ | $\phi$ | $\theta_r$ | $\theta_f$ | $\Delta nd$ |
| 31 | −40 | 167 | 135 | 90 | 3 | −194 | 410 | −194 | 167 | 45 | 3 | 90 | −40 |
| 32 | −36 | 184 | 135 | 97 | 3 | −176 | 410 | −182 | 184 | 45 | 3 | 92 | −38 |

The compensators of Examples 29 and 31 have better contrast than the compensators of Examples 30 and 32, respectively. Color shift is substantially similar for all four Examples. The compensator of Example 29 has somewhat better contrast than the compensator of Example 31.

Examples 33–37
Variation in Azimuthal Orientation

Table 12 illustrates changes in azimuthal orientation of the o-plates for compensators of o-mode TN liquid crystal displays. In Examples 33–35, the front and rear polarizers have azimuthal orientations of the pass axis of the polarizers of 133 and 47 degrees, respectively. In Examples 36 and 37, the front and rear polarizers have azimuthal orientations of the pass axis of the polarizers of 134 and 46 degrees, respectively.

TABLE 12

| | o-plate | | | | c-plate | TN | c-plate | o-plate | | | |
|---|---|---|---|---|---|---|---|---|---|---|---|
| Ex. | $\Delta nd$ | $\phi$ | $\theta_r$ | $\theta_f$ | $\Delta nd$ | $\Delta nd$ | $\Delta nd$ | $\Delta nd$ | $\phi$ | $\theta_r$ | $\theta_f$ |
| 33 | 159 | 133 | 30 | 3 | −95 | 410 | −95 | 159 | 47 | 3 | 30 |
| 34 | 159 | 137 | 30 | 3 | −95 | 410 | −95 | 159 | 43 | 3 | 30 |
| 35 | 159 | 135 | 30 | 3 | −95 | 410 | −95 | 159 | 45 | 3 | 30 |
| 36 | 159 | 134 | 30 | 3 | −95 | 410 | −95 | 159 | 46 | 3 | 30 |
| 37 | 159 | 136 | 30 | 3 | −95 | 410 | −95 | 159 | 44 | 3 | 30 |

The optical compensator of Example 33 has somewhat diminished contrast, but relatively similar color shift, when compared to the optical compensator of Example 35. The optical compensator of Example 34 has substantially reduced contrast, but relatively similar color shift, when compared to the optical compensator of Example 35. The optical compensators of Examples 36 and 37 have somewhat diminished contrast, but relatively similar color shift, when compared to the optical compensator of Example 35.

Examples 38–46
Comparison of E-Mode Optical Compensators with C-Plates and Biaxial Retarders.

Tables 13 and 15 illustrate optical compensators that utilize c-plates and Tables 14 and 16 illustrate optical compensators having biaxial retarders in the place of the c-plates positioned between the o-plates and the TN liquid crystal cell.

TABLE 13

| | o-plate | | | | c-plate | TN | c-plate | o-plate | | | |
|---|---|---|---|---|---|---|---|---|---|---|---|
| Ex. | $\Delta nd$ | $\phi$ | $\theta_r$ | $\theta_f$ | $\Delta nd$ | $\Delta nd$ | $\Delta nd$ | $\Delta nd$ | $\phi$ | $\theta_r$ | $\theta_f$ |
| 38 | 307 | 135 | 0 | 19 | −177 | 410 | −177 | 307 | 45 | 19 | 0 |
| 39 | 143 | 135 | 40 | 3 | −185 | 410 | −185 | 143 | 45 | 3 | 40 |
| 40 | 133 | 135 | 77 | 3 | −213 | 410 | −213 | 133 | 45 | 3 | 77 |

TABLE 14

| | o-plate | | | | biaxial $(\Delta nd)_{ip}/(\Delta nd)_{op}$ | TN | biaxial $(\Delta nd)_{ip}/(\Delta nd)_{op}$ | o-plate | | | |
|---|---|---|---|---|---|---|---|---|---|---|---|
| Ex. | $\Delta nd$ | $\phi$ | $\theta_r$ | $\theta_f$ | | $\Delta nd$ | | $\Delta nd$ | $\phi$ | $\theta_r$ | $\theta_f$ |
| 41 | 307 | 135 | 0 | 19 | 3/−169 | 410 | 3/−169 | 307 | 45 | 19 | 0 |
| 42 | 117 | 135 | 77 | 3 | 26/−216 | 410 | 26/−216 | 117 | 45 | 3 | 77 |

TABLE 15

| | c-plate | o-plate | | | | c-plate | TN | c-plate | o-plate | | | | c-plate |
|---|---|---|---|---|---|---|---|---|---|---|---|---|---|
| Ex. | $\Delta nd$ | $\Delta nd$ | $\phi$ | $\theta_r$ | $\theta_f$ | $\Delta nd$ | $\Delta nd$ | $\Delta nd$ | $\Delta nd$ | $\phi$ | $\theta_r$ | $\theta_f$ | $\Delta nd$ |
| 43 | −40 | 287 | 135 | 0 | 19 | −212 | 410 | −212 | 287 | 45 | 19 | 0 | −40 |
| 44 | −40 | 167 | 135 | 90 | 3 | −194 | 410 | −194 | 167 | 45 | 3 | 90 | −40 |

TABLE 16

| | c-plate | o-plate | | | | biaxial $(\Delta nd)_{ip}/(\Delta nd)_{op}$ | TN | biaxial $(\Delta nd)_{ip}/(\Delta nd)_{op}$ | o-plate | | | | c-plate |
|---|---|---|---|---|---|---|---|---|---|---|---|---|---|
| Ex. | $\Delta nd$ | $\Delta nd$ | $\phi$ | $\theta_r$ | $\theta_f$ | | $\Delta nd$ | | $\Delta nd$ | $\phi$ | $\theta_r$ | $\theta_f$ | $\Delta nd$ |
| 45 | −40 | 292 | 135 | 0 | 18 | 9−211 | 410 | 9−211 | 292 | 45 | 18 | 0 | −40 |
| 46 | −40 | 161 | 135 | 90 | 3 | 10−200 | 410 | 10−200 | 161 | 45 | 3 | 90 | −40 |

The contrast and color shift of the c-plate optical compensator of Example 38 and the biaxial retarder optical compensator of Example 41 are substantially similar. The optical compensators of Example 39, 40, and 42 have substantially similar contrast and color shift, with the color shift being slightly worse than the compensators of examples 38 and 41. The same can be said for Examples 43 and 44, except that the color shift and contrast of these compensators is worse than in Examples 38 and 41.

Examples 44 and 46 had comparable color shift and contrast to Examples 39, 40, and 42. Examples 43 and 45 had somewhat worse contrast and color shift.

Examples 47–58
Comparison of O-Mode Optical Compensators with C-Plates and Biaxial Retarders.

Tables 17 and 19 illustrate optical compensators that utilize c-plates and Tables 18 and 20 illustrate optical compensators having biaxial retarders in the place of the c-plates positioned between the opiates and the TN liquid crystal cell.

TABLE 17

| | o-plate | | | | c-plate | TN | c-plate | o-plate | | | |
|---|---|---|---|---|---|---|---|---|---|---|---|
| Ex. | $\Delta nd$ | $\phi$ | $\theta_r$ | $\theta_f$ | $\Delta nd$ | $\Delta nd$ | $\Delta nd$ | $\Delta nd$ | $\phi$ | $\theta_r$ | $\theta_f$ |
| 47 | 149 | 135 | 0 | 29 | −92 | 410 | −92 | 149 | 45 | 29 | 0 |
| 48 | 159 | 135 | 30 | 3 | −95 | 410 | −95 | 159 | 45 | 3 | 30 |

TABLE 18

| | o-plate | | | | biaxial $(\Delta nd)_{ip}/(\Delta nd)_{op}$ | TN | biaxial $(\Delta nd)_{ip}/(\Delta nd)_{op}$ | o-plate | | | |
|---|---|---|---|---|---|---|---|---|---|---|---|
| Ex. | $\Delta nd$ | $\phi$ | $\theta_r$ | $\theta_f$ | | $\Delta nd$ | | $\Delta nd$ | $\phi$ | $\theta_r$ | $\theta_f$ |
| 49 | 115 | 135 | 0 | 73 | 62/−144 | 410 | 62/−144 | 115 | 45 | 73 | 0 |
| 50 | 98 | 135 | 57 | 3 | 53/−134 | 410 | 53/−134 | 98 | 45 | 3 | 57 |

TABLE 19

| | c-plate | o-plate | | | | c-plate | TN | c-plate | o-plate | | | | c-plate |
|---|---|---|---|---|---|---|---|---|---|---|---|---|---|
| Ex. | $\Delta nd$ | $\Delta nd$ | $\phi$ | $\theta_r$ | $\theta_f$ | $\Delta nd$ | $\Delta nd$ | $\Delta nd$ | $\Delta nd$ | $\phi$ | $\theta_r$ | $\theta_f$ | $\Delta nd$ |
| 51 | −40 | 112 | 135 | 0 | 34 | −76 | 410 | −76 | 112 | 45 | 34 | 0 | −40 |
| 52 | −40 | 107 | 135 | 0 | 24 | −81 | 410 | −81 | 107 | 45 | 24 | 0 | −40 |
| 53 | −40 | 140 | 135 | 39 | 3 | −80 | 410 | −80 | 140 | 45 | 3 | 39 | −40 |
| 54 | −40 | 114 | 135 | 26 | 3 | −84 | 410 | −84 | 114 | 45 | 3 | 26 | −40 |

TABLE 20

| | c-plate | o-plate | | | | biaxial $(\Delta nd)_{ip}/(\Delta nd)_{op}$ | TN | biaxial $(\Delta nd)_{ip}/(\Delta nd)_{op}$ | o-plate | | | | c-plate |
|---|---|---|---|---|---|---|---|---|---|---|---|---|---|
| Ex. | $\Delta nd$ | $\Delta nd$ | $\phi$ | $\theta_r$ | $\theta_f$ | | $\Delta nd$ | | $\Delta nd$ | $\phi$ | $\theta_r$ | $\theta_f$ | $\Delta nd$ |
| 55 | −40 | 105 | 135 | 0 | 80 | 39–125 | 410 | 39–125 | 105 | 45 | 80 | 0 | −40 |
| 56 | −40 | 85 | 135 | 0 | 85 | 47–134 | 410 | 47–134 | 85 | 45 | 85 | 0 | −40 |
| 57 | −40 | 127 | 135 | 86 | 3 | 51/−132 | 410 | 51–132 | 127 | 45 | 3 | 86 | −40 |
| 58 | −40 | 117 | 135 | 90 | 3 | 54/−133 | 410 | 54–133 | 117 | 45 | 3 | 90 | −40 |

The contrast of the optical compensators of Examples 47, 48, 49, and 50 are substantially similar. The color shift of Examples 48 and 50 is somewhat better than that of Example 49 which is, in turn, somewhat better than that of Example 47. The contrast and color shifts of Examples 51–58 are substantially similar.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A liquid crystal display, comprising:
   a first positive o-plate;
   a first retarder;
   a liquid crystal cell, wherein the first retarder is disposed between the first o-plate and the liquid crystal cell;
   a second retarder, wherein at least one of the first and second retarders is a biaxial retarder; and
   a second positive o-plate, wherein the second retarder is disposed between the second o-plate and the liquid crystal cell.

2. The liquid crystal display of claim 1, wherein both the first and second retarders are biaxial retarders.

3. The liquid crystal display of claim 1, wherein one of the first and second retarders is a c-plate.

4. The liquid crystal display of claim 1, wherein the biaxial retarder has a negative out-of-plane birefringence.

5. The liquid crystal display of claim 1, further comprising a first o-plate positioned so that the first o-plate is between the first o-plate and the liquid crystal cell.

6. The liquid crystal display of claim 5, further comprising a second o-plate positioned so that the second o-plate is between the second o-plate and the liquid crystal cell.

7. A liquid crystal display, comprising:
- a first o-plate;
- a first retarder;
- a liquid crystal cell, wherein the first retarder is disposed between the first o-plate and the liquid crystal cell;
- a second retarder, wherein at least one of the first and second retarders is a biaxial retarder;
- a second o-plate, wherein the second retarder is disposed between the second o-plate and the liquid crystal cell; and
- a first c-plate positioned so that the first o-plate is between the first c-plate and the liquid crystal cell.

8. The liquid crystal display of claim 7, further comprising a second c-plate positioned so that the second o-plate is between the second c-plate and the liquid crystal cell.

9. The liquid crystal display of claim 7, wherein both the first and second retarders are biaxial retarders.

10. The liquid crystal display of claim 7, wherein one of the first and second retarders is a o-plate.

11. The liquid crystal display of claim 7, wherein the biaxial retarder has a negative out-of-plane birefringence.

12. A liquid crystal display, comprising:
- a first o-plate having a first azimuthal orientation;
- a first c-plate;
- a liquid crystal cell comprising a rear surface and a front surface, wherein the liquid cyrstals at the rear surface have a second azimuthal orientation and the liquid crystals at the front surface have a third azimuthal orientation and wherein the first o-plate is disposed between the first o-plate and the liquid crystal cell;
- a second o-plate;
- a second o-plate having a fourth azimuthal orientation, wherein the second o-plate is disposed between the second o-plate and the liquid crystal cell; and
- a third o-plate positioned so that the first o-plate is between the third o-plate and the liquid crystal cell and a) the first and second azimuthal orientation, b) the second and third azimuthal orientation, and c) the third and fourth azimuthal orientation, respectively, differ by substantially the same increment, and;
- wherein the first, second, third and fourth azimuthal orientation are disposed in a helical arrangement and the third o-plate is a positive o-plate.

13. The liquid crystal display of claim 12, further comprising a fourth c-plate positioned so that the second o-plate is between the fourth o-plate and the liquid crystal cell and the third and fourth c-plate are positve c-plate.

* * * * *

UNITED STATES PATENT AND TRADEMARK OFFICE
CERTIFICATE OF CORRECTION

PATENT NO.     : 6,919,946 B2
DATED          : July 19, 2005
INVENTOR(S)    : Allen, Richard C.

It is certified that error appears in the above-identified patent and that said Letters Patent is hereby corrected as shown below:

Column 3,
Line 46, after "angle" delete "ϕ" and insert -- θ --.

Column 5,
Line 4, delete "$n_x \neq n_y \neq_z$" and insert -- $n_x \neq n_y \neq n_z$ --.

Column 6,
Line 32, delete "1500nm" and insert -- ±500nm --.
Line 34, delete "+750nm" and insert -- ±750nm --.

Column 7,
Line 47, delete "opiates" and insert -- o-plates --.

Column 10,
Line 17, delete "opiates" and insert -- o-plates --.

Column 19,
Line 20, delete "opiates" and insert -- o-plates --.

Column 21,
Line 2, after "a first" delete "o-plate" and insert -- c-plate --.
Lines 3, 6 and 27, delete "o-plate" and insert -- c-plate --.
Line 5, after "a second" delete "o-plate" and insert -- c-plate --.

Column 22,
Line 6, delete "cyrstals" and insert -- crystals --.
Lines 8, 11, 13, 16 and 26, delete "o-plate" and insert -- c-plate --.
Line 15, after "a third" delete "o-plate" and insert -- c-plate --.
Lines 17, 18, 19 and 22, delete "orientation" and insert -- orientations --.
Line 23, after "the third" delete "o-plate" and insert -- c-plate --.
Line 23, after "positive" delete "o-plate" and insert -- c-plate --.

UNITED STATES PATENT AND TRADEMARK OFFICE
CERTIFICATE OF CORRECTION

PATENT NO. : 6,919,946 B2
DATED : July 19, 2005
INVENTOR(S) : Allen, Richard C.

It is certified that error appears in the above-identified patent and that said Letters Patent is hereby corrected as shown below:

Column 22 (cont'd),
Line 27, after "fourth" delete "c-plate" and insert -- c-plates --.
Line 27, delete "positive c-plate" and insert -- positive c-plates --.

Signed and Sealed this

Seventh Day of February, 2006

JON W. DUDAS
*Director of the United States Patent and Trademark Office*